United States Patent [19]
Fairneny

[11] 3,734,688
[45] May 22, 1973

[54] LAUNDRY APPARATUS
[76] Inventor: Samuel Fairneny, 16 Willow Road, Wellesley, Mass.
[22] Filed: Dec. 27, 1971
[21] Appl. No.: 212,815

Related U.S. Application Data
[63] Continuation of Ser. No. 35,394, May 7, 1970, abandoned.

[52] U.S. Cl. ...................8/159, 68/12 R, 68/19 Z, 68/20
[51] Int. Cl. ............................................D06f 33/02
[58] Field of Search.............68/12 R, 12 F, 20, 68/19.1, 19.2; 8/158, 159

[56] References Cited
UNITED STATES PATENTS

| 2,868,004 | 1/1959 | Runde | 68/12 R |
| 3,102,407 | 9/1963 | Stilwell | 68/12 R X |
| 3,508,340 | 4/1970 | Kombol | 68/12 R X |
| 3,566,063 | 2/1971 | McConnell | 68/12 R X |

Primary Examiner—William I. Price
Attorney—Robert C. Schmertz, Jr.

[57] ABSTRACT

Laundry washer and drier equipment is adapted for washing sorted classes of fabrics, such as towelling, bed linens, and "no-iron" fabrics. Wash cycle lengths for the various classes of fabric are determined and the washer timer dial is marked for the start and finish time of each fabric. The dial on a drier having dry cycle times equal in length to the wash cycle times has its timer dial marked in the same manner.

4 Claims, 5 Drawing Figures

Patented May 22, 1973

INVENTOR
SAMUEL FAIRNENT

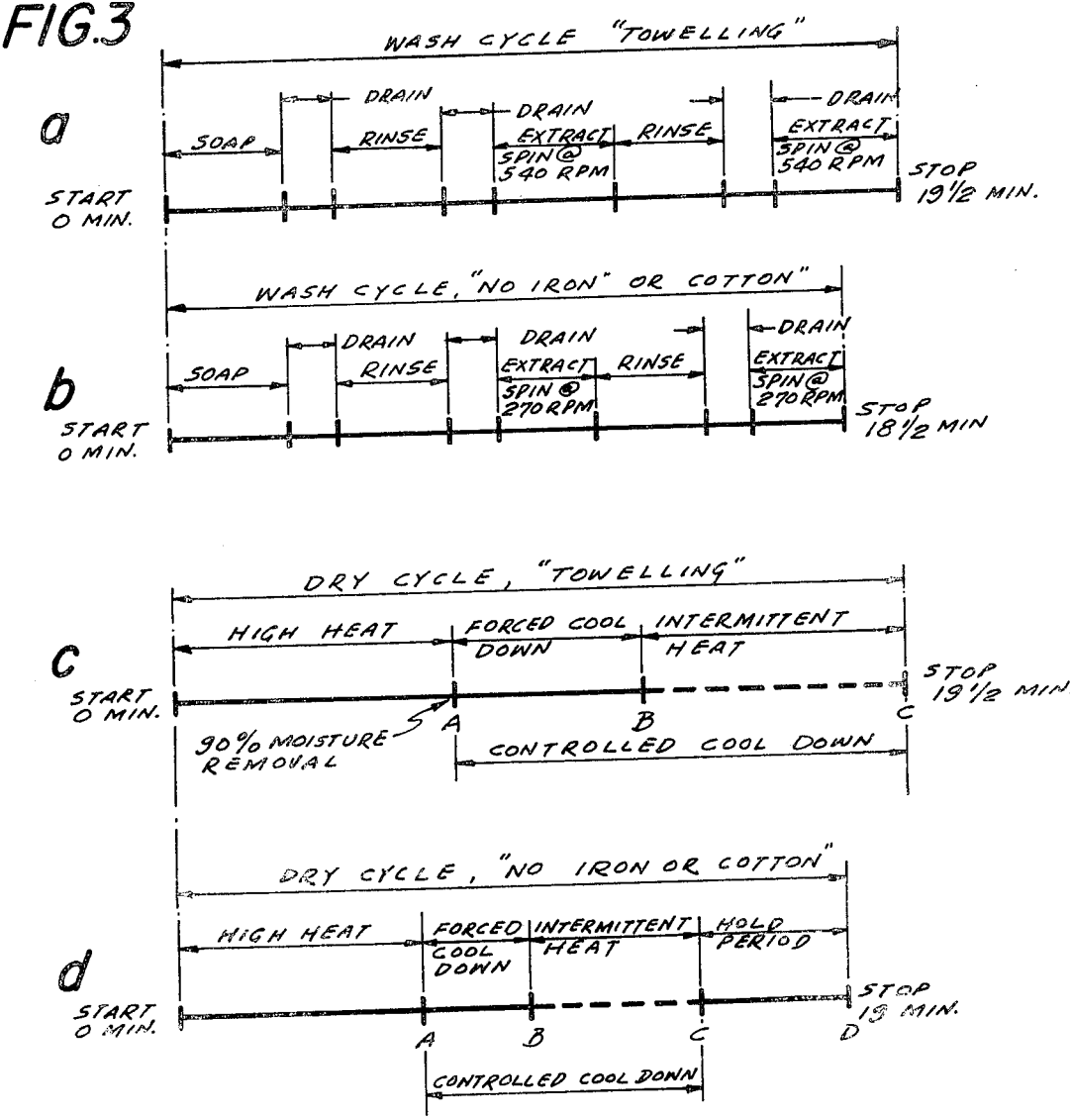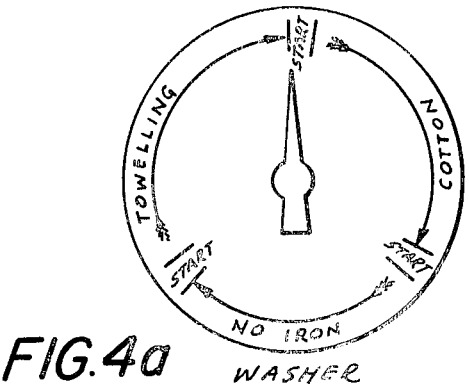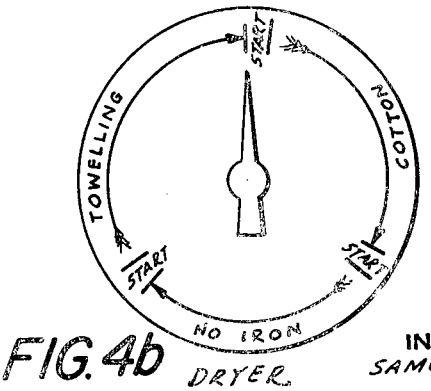

LAUNDRY APPARATUS

This is a continuation of application Ser. No. 35,394, filed May 7, 1970 and now A method of reducing the operating time of a hot air laundry drier to match the shorter operating time of a washer-extractor. Air directed against the tumbling load of wet wash in the drier is heated above the boiling temperature of water and is passed through the load. The humidity of the air leaving the load is measured, and when it drops to a predetermined low value, heating of the air ceases until the air leaving the load drops to a predetermined temperature. Cooling of the load then continues at a rate controlled by intermittent heating of the air. At a second predetermined temperature, the application of heat ceases. The length of the drying cycle is principally controlled by adjustment of the initial hot air temperature, and may be matched to the operating time of a washer-extractor. In one embodiment, the air supplied to the load is first elevated to a temperature below that at which the load maybe scorched. The predetermined low humidity value is that at which about 90 percent, by weight, of the moisture in the load is removed, the first predetermined temperature is about 150° and the second abandoned.

is about 120°, and the combined times of first heating and controlled heating are made to equal the operating time of the washer-extractor by adjusting the temperature of the first heating.

A drier adapted to perform in accordance with the above method has a humidistat set to discontinue the first heat when the predetermined humidity value is attained, and thermostatically controlled initiation and termination of a timer controlled, intermittent application of heat during the cooling down period.

This invention relates to new and improved methods and apparatus for washing laundry. More specifically, it relates to a new method for operating a washer and a drier, and to a new method and apparatus for use in a laundry.

Laundries constructed for the purpose of washing fabrics in large quantities usually employ separate washer-extractor and drying machines. Because of the varying nature of the loads which are normally processed, the operating cycles of these machines are normally of considerably different lengths of time. For example, while a well-designed washer-extractor may require a maximum operating time of twenty to thirty minutes to thoroughly clean and to extract the excess moisture from a wash load, a drier may require as long as an hour to dry the same load. Such a load would be one, for example, which contains much towelling or other highly absorbent fabric.

In the operation of a laundry, I have found that many conveniences and significant economic advantages can be obtained by operating the drier on a time cycle which corresponds in length, approximately, to the time required for operation of the washer-extractor. It then becomes possible, for example, to directly and immediately reload the washer without lost washer operating time. When the first load is through the drier, both machines are ready for reloading at about the same time and the operator is left free to process the output of the drier while the two machines are continuously in use. Thus, where two driers might previously have been used to service one washer, now only one drier is required. Also, operator time otherwise lost while waiting for the drier to finish is more usefully employed in subsequent processing of the clean, dried load.

Previously, driers have been operated at low temperatures in order to protect certain types or fabrics or garments. I have found that for many applications, particularly for institutions processing their own linens, towelling, and uniforms, such as hotels, motels, and hospitals, the fabric content of the loads going through the washers is of a predictable character which lends itself to a high degree of pre-sorting. This in turn permits more precise control of the mode of operation of the laundry machines. For example, since towelling requires twice the extraction speed permissible in "no-iron" fabrics or required for cottons, a washing machine may be designed to have two basic cycles, each containing the desired extract speeds, and yet having approximately identical total cycle times for either fabric.

Further, since particularly fragile fabrics such as rayons, rubber-containing articles, and the like, are not necessarily mixed in with other types of fabric, variations can be made in processing in the drier which otherwise might result in a hazard of fire. Thus, I have found that it is safe to raise the initial hot air temperature in the drier almost to the scorching point during the initial drying phase whereas the prior art has restricted itself to the use of lower temperatures with longer drying times. I have also found that, as a consequence of using high temperatures for drying, bacteria counts in laundry loads are reduced to acceptable levels, even though the preceding wash water temperatures have been reduced. This is particularly important in the case of "no-iron" fabrics which cannot safely be washed at temperatures above 150° without damage to the resin with which they are impregnated, and consequent loss of "no-iron" characteristics. Thus, where "no-iron" fabrics could not be used previously in institutions because of lack of sterility, it is now possible for their labor-saving advantages to be realized by the institutions in their bed linen, personal uniforms, and the like.

Most driers of which I am aware have heretofore employed a constant, thermostatically controlled, heat level throughout the drying cycle, possibly followed by a no-heat cooling down period. I have found that the use of a gradually declining temperature is preferable, particularly in the case of "no-iron" fabric which may be adversely affected by "thermal shock" in the drying cycle, as well.

Thus, given a drier whose cycle time for a given fabric is approximately equal to that of its associated washer, it is now possible to mark the control equipment for each machine in an identical way, thus providing simple, identical operating procedures for each machine which simplify operator training and minimize operator error.

Briefly, these advantages and others which will become apparent from reading the below appended specification are achieved in the following manner.

To obtain matched washer-extractor and drier operating times, the maximum time for efficient operating of the washer-extractor on a highly absorbent load is first established. Thus, where fabrics in the wash load are classified according to type, cotton and "no-iron" fabrics ordinarily require less extract time than do towels and the like, even where the extract speed of the washer is raised to its maximum effective speed for towelling. For example, in a washer suited for this type of laundry operation, the extract speed on cottons and "no-iron" fabrics may be about 270 r.p.m., a speed which minimizes wrinkling while permitting an effective extraction. A speed of 540 r.p.m. is used for towelling, where wrinkling is not a serious problem.

The method of drying underlying this concept of matched washing and drying times is composed of two principal steps or periods: A first or high heat period during which the load is exposed to hot air at nearly scorching temperatures, and a cooling down period during which the temperature is reduced at a controlled rate to prevent harmful shock to "no-iron" fabrics when they are being run. (It will be understood that where "no-iron" fabrics are not being run, the cooling down rate may be accelerated by using room air.)

For flexibility of operation, the drying cycle, when embodied in a machine, may be divided into three or more parts: a first, high heat period, during which the bulk of the moisture in the load is removed, a second, cooling down period, during which the load continues to dry at a controlled rate, and third, hold period, where the load continues to be tumbled in the air stream without heat until it is to be removed from the machine. The hold period is employed when drying loads of higher fabrics, such as cottons and "no-iron" fabrics which dry quickly; it keeps them in motion until the operator is ready to remove them from the machine and so avoids wrinkling which would occur if they were allowed to sit in the machine.

As mentioned above, the cooling down portion of the cycle is important in handling "no-iron" fabrics in order to prevent damage. In accordance with the teachings of the invention, where an initial high heat is used but terminated after 90 percent of the moisture is removed, supplemental drying is also required. As was the case with the washer-extractor, towelling requires the greatest amount of time for drying. This second part of the drying cycle, thus, must be fixed first, when setting conditions for matching washer and drier cycles. To this end, the drier is first operated with reasonably elevated initial heats until 90 percent of the water, by weight, has been removed from a load of towelling. The load is then allowed to cool to 150° by tumbling it in the unheated drier air stream, and heat is then supplied intermittently to reduce the cooling rate until the end temperature is reached. A temperature of 120° is suitable for handling of the load, and is economical of heat, as well.

The high heat portion of the cycle may then be determined with towelling loads, while calibrating a humidity sensor to determine the switch-over point from the high heat portion to the cooling down portion of the cycle. Towelling loads are dried and weighed at successively higher temperatures until approximately 90 percent of the moisture, by weight, has been removed from the load, and until the length of the high heat period, plus the length of the controlled cooling period is equal to the washer-extractor time. The humidity sensor, which may be activated by the rising temperature of air leaving the load as it dries by evaporation, can be set so that activation occurs when 90 percent moisture removal is attained. The length of the cycle is repeatedly reduced until the total cycle length equals that of the washer-extractor for the same laundry load. The upper limit of air temperature is the point at which scorching of the load begins.

A washer meeting the requirements of the broader aspects of the invention may, for example, have separate cycles for towelling and for cotton and "no-iron" fabrics. In the towelling cycle, high extract speeds are used.

A drier embodying the method of the invention may be provided by adapting a conventional hot air tumbler drier. In such a drier a supply of fresh air is drawn by an exhaust blower down from one or more gas fired burners and directed through a perforated, horizontal, metal cylinder in which the load to be dried is placed. As the cylinder is rotated by an external drive, the heated air is drawn through it and thence passes through a lint trap to the exhaust fan. From the exhaust fan the air is exhausted to the atmosphere through a stack. The burners should be capable of heating the input air well above 240°. The humidity sensor may be a conventional, temperature activated type, so long as it is sufficiently sensitive to determine accurately the point of 90 percent moisture removal. It is preferably located in the exhaust stack a sufficient distance from the exhaust fan output to minimize variations induced by turbulence. The cooling down control thermostats may also be located in the stack.

Reference is now made to the drawings in which:

FIG. 3 is a chart showing typical washer-extractor cycles in machines adapted for operation according to the teachings of the invention;

FIG. 4a. and 4b. illustrate washer and drier control dial plates suitable of use in the practice of the invention.

Figure 1:
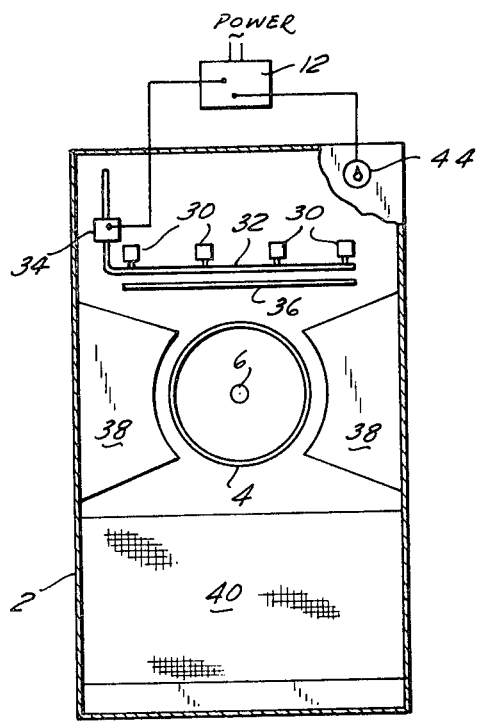
FIG. 1 is a schematic view in cross-section taken from the front of a drier embodying the invention.
Figure 2:
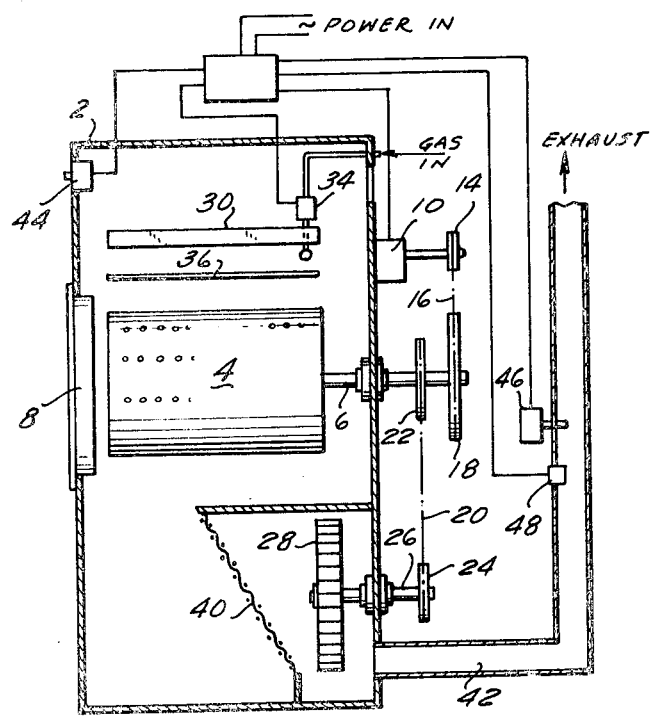
FIG. 2 is a schematic view in cross-section taken from the side of a drier embodying the invention.

Referring now to FIG. 1 and 2, a conventional hot air drier is shown in which enclosure 2 surrounds and supports cylinder or wheel 4 for rotation about its longitudinal axis on shaft 6. The wash load may be inserted into wheel 6 through front door 8 which is normally closed during the operation of the drier. Electric motor 10, supplied with electricity from control box 12, drives cylinder shaft 6 through drive pulley 14, drive belt 16, and cylinder shaft pulley 18. In turn, drive belt 20, running in pulley 22 on cylinder shaft 6, turns pulley 24 on exhaust fan drive shaft 26. Heat for air pulled through wheel 4 by exhaust fan 28 is supplied by gas burners 30. Gas to burners 30 is supplied by pipe 32 from solenoid valve 34. Solenoid valve 34 is electrically activated from control box 12. Top baffle plate 36 and side-deflectors 38 serve, respectively, to prevent the direct incidence of flame on wheel 4 and to redirect the flow of heated air passing around baffle 36 to wheel 4, confining the air flow to achieve maximum heating effect on wheel 4 and its contents. Lint screen 40 is placed across the input of exhaust fan 28 to intercept lint transported by air leaving the load in cylinder 4, preventing passage of lint through exhaust stack 42 to the atmosphere. The structure of the drier to this point, with the possible exception of a larger heating capacity, is conventional, and capable of performing in the usual manner.

Reference is now made to FIGS. 3a, and 3b, which shows cycle sequences employing the teachings of the invention as applied to a washer having separate towelling, and cotton-"no-iron" cycles. FIG. 3a, shows the washer cycle for towelling as requiring about 19½ minutes and using an extract speed of 540 r.p.m. It will be noted that the difference between this cycle and that of the cotton and "no-iron" cycle of FIG. 3b, is in the extract portion of the cycle. In the latter, extraction occurs at 270 r.p.m., and the extract cycles are a half minute shorter. These wash cycles are illustrative, having been determined for one type of machine operating to produce speed to minimize wrinkling of cotton and "no-iron" fabric consistent with obtaining good extraction of water. For towelling, the highest extract speed consistent with mechanical convenience in machine design and cycle length, was chosen. It will be understood other conventional washer equipment may be modified to perform in accordance with the teaching of the invention by similar modifications well understood in the art.

FIG. 3c and FIG. 3d show the differences in drier cycles for towelling and "no-irons" respectively. The basic high heat and controlled cool down portions of the drier curve are denoted by "Start" to point A, and point A to Point C, respectively. Between points A and B, no heat is supplied to the load, and the timer motor is off. Point A is reached when 90 percent of the moisture in the load, by weight, has been removed as determined by the humidity sensor, and sustained heating of the drier air is stopped. Between points A and B, no heat is supplied to the drier air. Point B is determined by thermostat, when the air leaving the load has reached 150°. At this point, the timer is restarted, and the air to the load is heated intermittently to reduce the rate of cooling and avoid thermal shock, for example, to "no-iron" fabrics. Since the over all drier cycle time has been matched to the washer time for towelling as described above, timer controlled operation of the drier stops, in the case of a machine having a full, highly absorbent load, when the exhaust air reaches 120° point C on the diagram. In FIG. 3d a hold period from C to D is shown, during which no heat is supplied to the load. In this case the timer shuts the drier down after the predetermined time at point D. Cottons and "no-irons" require much less total drying time than towelling, and the full, matching drier cycle time is rounded out by operating the machine to point D with no heat supplied to avoid new wrinkling of the load.

Conventional drier control circuitry is modified according to the teachings of the invention in both drier cycles to provide for start of the cycle by rotation of a timer control knob to start timer 44 and to initiate the high heat, by activating solenoid valve 34. The motor in timer motor 44 need not operate during high heat and during the forced cool down period. When humidity sensor 46 is activated by the rise in temperature in exhaust stack 8, solenoid valve 46 is closed, as by interrupting a holding circuit, and cool air is drawn through the load by continued operation of exhaust blower 28. The humidity sensing device may, for example, be a Robertshaw Humidistat Model KXR-2-72, having a maximum temperature setting of 250°. With it, 240° exhaust air temperatures have been found to equal 90 percent moisture removal in a typical 50 pound drier. The load continues to cool while tumbling until thermostatic control unit 48, located in the stream of air exhausted from the load, senses a temperature of about 150° (point B), the point at which the addition of supplemental heat in bursts will not risk scorching the load. A signal from thermostatic control unit 48 returns the unit to timer control and solenoid valve 34 is intermittently activated to cool the load at a slower, controlled rate. The cooling rate during this portion of the cooling cycle is, as was stated above, determined by the need to protect "no-iron" fabrics from resin damage by too rapid cooling and the need to achieve full drying of the load. Intermittent heating is stopped by a second temperature signal from thermostatic control unit 48, as, for example, from a second thermostat which senses exhaust air temperature of 120° (point C) and stops the intermittent heating of the air. When, as in the case of cotton or "no-iron" loads, cooling to 120° is accomplished prior to the full desired drier cycle time, tumbling and cooling continues under control of timer 34 until full time (point D) has expired.

Advantageous use of the simultaneous operating times provided by this invention may be taken by providing controls on the washer and drier which duplicate the settings required for the same type of fabric load. FIGS. 4a, and 4b, show a pair of control dial plates; FIG. 4a is for a washer extractor, and FIG. 4b for a drier. The controls to which these dials are attached may be, for example, of the multiple cam type in which a rotary shaft is driven by a timing motor for rotating the shaft once every hour and a half. The rotary shaft carries a number of cam discs, each of which has three control profiles spaced around its circumference to correspond to the three cycles marked on its dial plate, and of which each controls a particular function of the associated control circuitry. A particularly convenient feature of the invention is that the orientation of the control pointer knob on each control is the same for starting each cycle. Thus, the same dial position or physical setting used on the washer for a load of towels is used on the drier when that load is moved to it. For the sake of illustration, markings showing the specific part of the wash or dry cycle in which the machine is operating at a given time—information which is made available by means of the timer shaft and pointer—is omitted, but one skilled in the art will readily understand that such markings may be supplied.

While I have shown the invention in one embodiment, it will be apparent to those skilled in the art that equivalent components may be used in laundry systems employing the invention and that specific operating limits must be determined for particular machine characteristics. Thus, for example, electric heaters may be substituted for the gas-fired burners, other types of humidity sensor may be used than a humidistat, etc. It is intended, therefore, that the below appended claims be given the broadest interpretation in keeping with the spirit of the invention.

I claim:

1. In a laundry, the combination of a washer-extractor having at least two predetermined wash cycles of substantially equal operating time, one of the cycles having a high extract speed for rapid removal of water from highly absorbent fabric loads and another cycle having a lower extract speed for removal of water from less absorbent fabric loads while minimizing wrinkling, and a separate, forced hot air, temperature-controlled drier whose operating time, regardless of the absorbency of its load, is substantially equal to the operating times of the washer extractor.

2. The laundry of claim 1 in which the drier has predetermined cycles corresponding in number and fabric classification to those of the washer-extractor, and in which the drier employs an initial hot air temperature near to, but below, that at which the fabric can be scorched.

3. The laundry of claim 2 in which each machine has identical cycle selector controls with identical physical positions corresponding to the classification of the loads.

4. The method of operating a laundry having a washer-extractor which extracts at differing speeds, and a separate forced hot-air drier which includes the steps of:

sorting the fabrics to be washed into highly absorbent and moderately absorbent loads while excluding fragile fabrics which might result in a hazard of fire, establishing a basic cycle time by determining the cycle time for the effective washing of one or more moderately absorbent loads while using an effective extract speed which minimizes wrinkling, matching the basic cycle time in the washer for highly absorbent loads by obtaining effective extraction at a much higher extract speed, and so determining a second washer cycle, matching the basic cycle time in the drier for washed and extracted highly absorbent loads by selecting an initial hot air temperature near to, but below, that at which fabric in the loads is scorched, interrupting heating of the air when the bulk of the moisture is removed from the loads, cooling the load to an intermediate temperature, and continuing heating of the load until it is dry, adjusting the temperatures until the basic cycle time is matched, thus establishing a first drier cycle, matching the established basic cycle time in the drier for moderately absorbent loads by using an initial hot air temperature near to, but below, that at which fabric in the load is scorched, interrupting heating of the air when the bulk of the moisture is removed from the load, cooling the load to an intermediate temperature, heating the air, as needed, until the loads are dry, and continuing operation of the machine without heat, until the cycle time is complete, thus determining a second drier cycle, and then processing subsequent loads of presorted fabrics by washing a first load while using the appropriate cycle, transferring the first load to the drier at the end of the wash cycle and initiating the appropriate dry cycle, reloading the washer without delay and initiating the appropriate wash cycle, unloading the drier when its cycle is complete, transferring the completed second load from the washer to the drier without delay and initiating the appropriate dry cycle, reloading the washer with a third load and initiating the appropriate cycle, an continuing to sequence the presorted loads on the basic cycle time until all are complete, thereby keeping the machines in continuous use, while remaining free to perform other tasks during the basic cycle time.

* * * * *